(12) United States Patent
Dhoolia et al.

(10) Patent No.: US 7,937,250 B2
(45) Date of Patent: May 3, 2011

(54) METHOD AND SYSTEM FOR ADDRESSING NON-FUNCTIONAL CONCERNS

(75) Inventors: Pankaj Dhoolia, Uttar Pradesh (IN); Prashant Jain, Delhi (IN); Kamal Bhattacharya, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 11/741,555

(22) Filed: Apr. 27, 2007

(65) Prior Publication Data

US 2008/0270087 A1    Oct. 30, 2008

(51) Int. Cl.
*G06F 17/10* (2006.01)

(52) U.S. Cl. .............................................. 703/2; 702/22

(58) Field of Classification Search .............. 703/2, 22; 705/1, 7; 707/138 R
See application file for complete search history.

(56) References Cited

U.S. PATENT DOCUMENTS

| | | | |
|---|---|---|---|
| 5,537,526 | A | 7/1996 | Anderson et al. |
| 5,966,711 | A | 10/1999 | Adams |
| 6,349,332 | B2 | 2/2002 | Hayball et al. |
| 6,999,963 | B1 | 2/2006 | McConnell |
| 2006/0242195 | A1* | 10/2006 | Bove et al. ................. 707/103 R |

OTHER PUBLICATIONS

R. Hull et al., "Semantic database modeling: survey, applications, and research issues," ACM Computing Surveys, vol. 19, No. 3, Sep. 1987.
R. Conradi et al., "Version models for software configuration management," ACM Computing Surveys, vol. 30, No. 2, Jun. 1998.
N. Ide et al., "A common framework for syntactic annotation," Proceedings of ACL'2001, Toulouse, year 2001.
G. Gupta et al., "Parallel execution of prolog programs: A survey," ACM Transactions on Programming Languages & Systems, vol. 23, No. 4, Jul. 2001.

* cited by examiner

*Primary Examiner* — Russell Frejd
(74) *Attorney, Agent, or Firm* — Jeffrey T. Holman

(57) ABSTRACT

Non-functional concerns are addressed within an abstract model corresponding to a real-world system. One or more annotations profiles are constructed. Each annotations profile describes one or more annotations, where each annotation corresponds to and represents one of the non-functional concerns. Each of a number of modeling elements of the abstract model is associated with an annotation corresponding to a non-functional concern pertaining to the modeling element. One or more transformation templates are constructed. Each transformation template transforms the abstract model to a specific implementation platform to which the transformation template corresponds. For each transformation template, the abstract model as has been transformed to the specification implementation platform to which the transformation template corresponds is executed. Such execution results in consumption of the non-functional concerns represented by the annotations associated with the modeling elements.

22 Claims, 4 Drawing Sheets

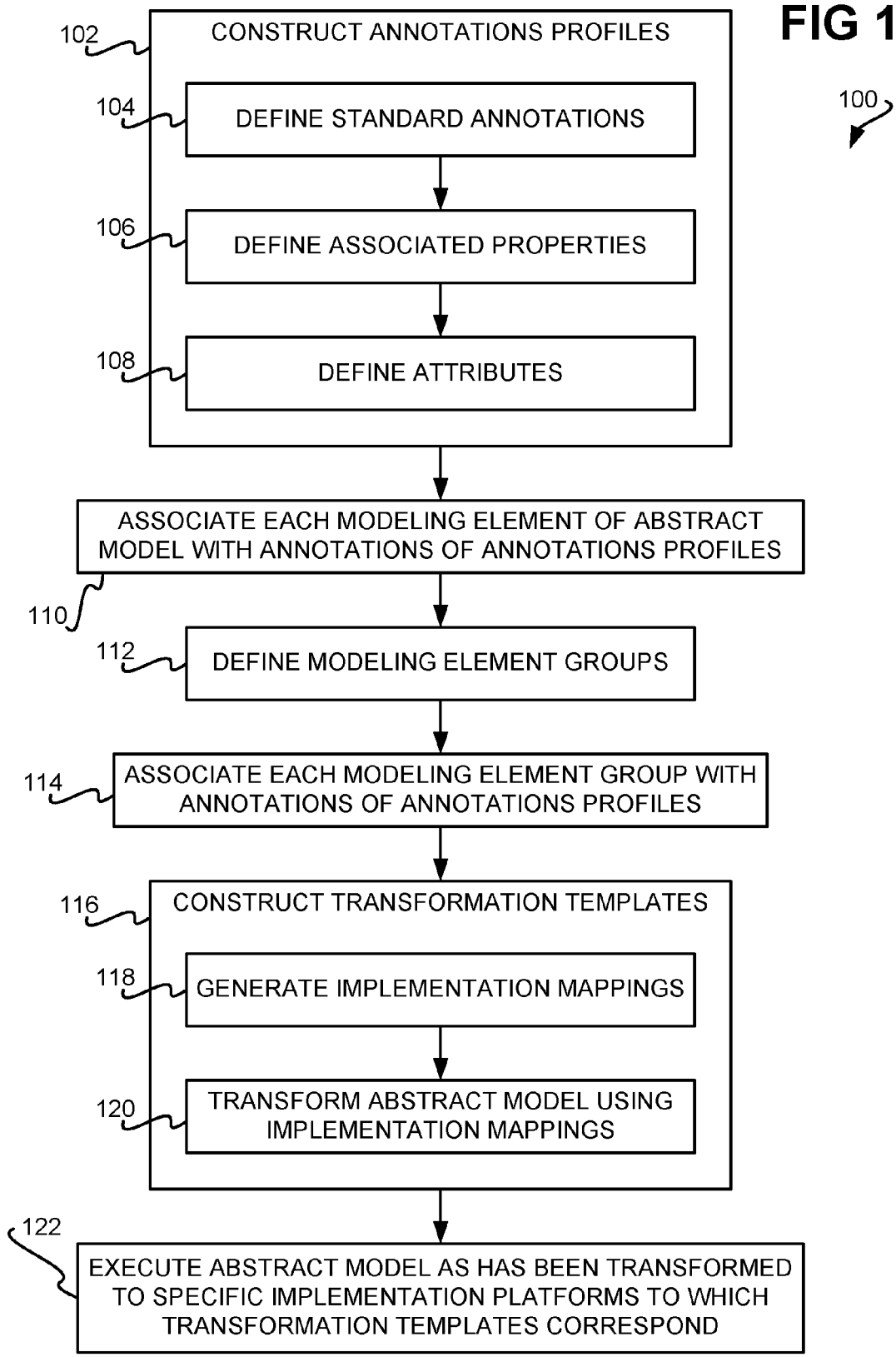

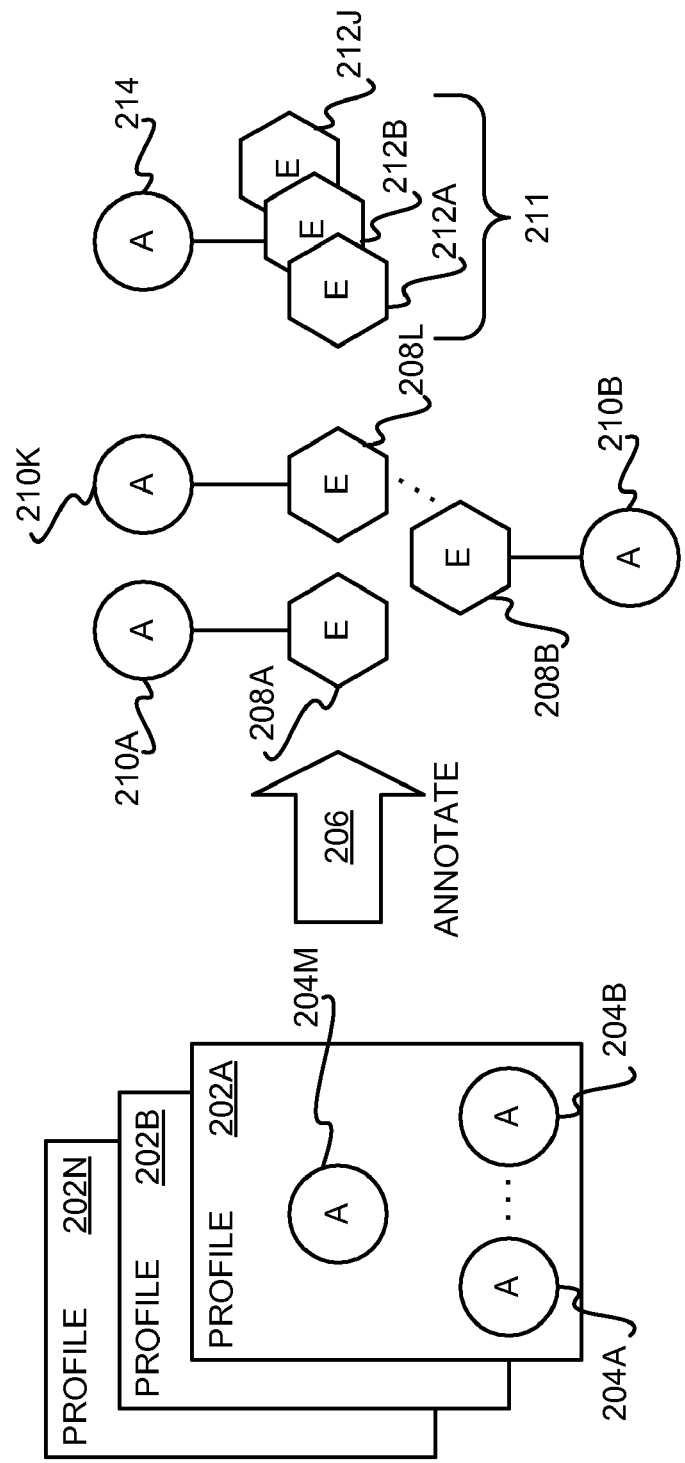

US 7,937,250 B2

METHOD AND SYSTEM FOR ADDRESSING NON-FUNCTIONAL CONCERNS

FIELD OF THE INVENTION

The present invention relates generally to non-functional concerns, such as security-related and audit-related concerns, among others, and more particularly relates to addressing such non-functional concerns within an abstract model using annotations.

BACKGROUND OF THE INVENTION

Information technology has proven adept at modeling a real-word system as an abstract model, and transforming the abstract model to a specific implementation platform so that the abstract model can be executed for testing and other purposes. Examples of such real-world systems that can be modeled include computing-related systems, such as large networks and other types of such systems. Modeling real-world systems is useful because it substantially ensures that the system will operate properly when the system is actually implemented.

Unfortunately, real-world system modeling does not address a significant gap between business process modeling and such information technology-related modeling. In particular, business processes typically include non-functional concerns. Such concerns are requirements of the resulting real-world system, other than the core functional expectations of the system. Examples of non-functional concerns include security-related and audit-related concerns. Since they are not technically needed as part of the core functionality of real-world systems, information technology modeling of the systems have historically ignored them.

This is disadvantageous, because the resulting business success of a real-world system, as opposed to the technical success of the system, can indeed be affected by whether these non-functional concerns are addressed. For example, a real-world system may technically perform as expected, but not provide for auditing, which is needed for business purposes. As another example, a real-world system may technically perform as expected, but not satisfy security issues, which may be needed for business purposes. Therefore, a shortcoming of prior art information technology modeling of real-world systems is that such modeling does not address non-functional concerns.

SUMMARY OF THE INVENTION

The present invention relates to addressing non-functional concerns within an abstract model. A method of one embodiment of the invention addresses non-functional concerns within an abstract model corresponding to a real-world system. One or more annotations profiles are constructed. Each annotations profile describes one or more annotations, and each annotation corresponds to and represents one of the non-functional concerns. Each of a number of modeling elements of the abstract model is associated with an annotation corresponding to a non-functional concern pertaining to the modeling element. One or more transformation templates may be constructed. Each transformation template transforms the abstract model when executed to a specific implementation platform to which the transformation template corresponds. Such execution results in consumption of the non-functional concerns represented by the annotations associated with the modeling elements.

A system of one embodiment of the invention includes at least an annotations profile mechanism, an annotation association mechanism, and a transformation mechanism. The annotations profile mechanism defines one or more annotations profiles. Each annotations profile describes one or more annotations. Each annotation corresponds to and represents a functional concern of an abstract model. The annotation association mechanism is to associate each of a number of modeling elements of the abstract model with an annotation corresponding to a non-functional concern pertaining to the modeling element. The transformation mechanism is to transform the abstract model to a specific implementation platform. As such, execution of the abstract model as has been transformed results in the non-functional concerns represented by the annotations associated with the modeling elements being consumed.

A computer-readable medium of one embodiment of the invention stores one or more computer programs. Upon execution of the computer programs, the method that has been described is performed. The computer-readable medium may be a tangible medium, such as a recordable data storage medium, in one embodiment of the invention.

Embodiments of the invention provide for advantages over the prior art. Whereas conventional information technology modeling of real-world systems results in abstract models do not address non-functional concerns, embodiments of the invention enable abstract models to address to such non-functional concerns. Existing modeling approaches may be enhanced so that non-functional concerns are addressed, by, for instance, associating the modeling elements of existing abstract models with annotations that represent and correspond to non-functional concerns. Still other aspects, advantages, and embodiments of the invention will become apparent from the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a flowchart of a method for addressing non-functional concerns within an abstract model representing a real-world system, according to an embodiment of the invention.

FIGS. 2A, 2B, and 2C are diagrams illustratively depicting representative performance of the method of FIG. 1, according to an embodiment of the invention.

DETAILED DESCRIPTION OF THE DRAWINGS

Figure 2B:
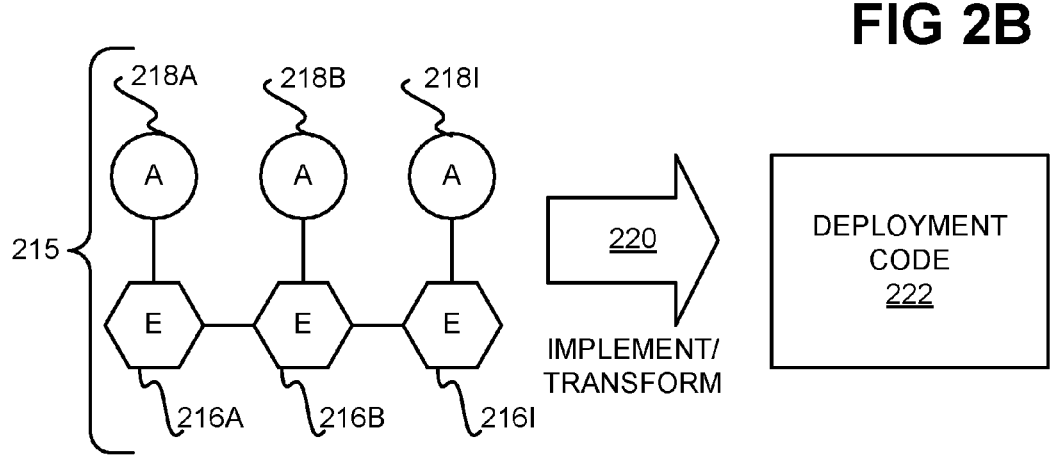

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

FIG. 1 shows a method 100 for addressing non-functional concerns within an abstract model that corresponds to a real-world system, according to an embodiment of the invention. The abstract model may be a conventional model that represents the real-world system. That is, the real-world system may be modeled, as the abstract model, using conventional techniques, as can be appreciated by those of ordinary skill within the art. At least some embodiments of the invention are concerned with addressing non-functional concerns within such an abstract model.

The real-world system that is modeled by the abstract model may be a computing system, or another type of system. The advantage of modeling the computing system prior to implementing the real-world system is that the real-world system can be tested and validated to ensure that the system works in accordance with functional requirements prior to deployment. Once the abstract model has been successfully tested and validated, the real-world system can be rolled out with a relatively high degree of certainty that it will function as designed.

The non-functional concerns that are addressed by embodiments of the invention within the abstract model of the real-world system are defined as requirements other than the core functional expectations of the system. Such non-functional concerns may include audit-related tasks, integrity and non-communication repudiation-related tasks, security policy validation-related tasks, and security authorization-related tasks, among other types of non-functional concerns. For example, a non-functional concern may be to audit a particular task within a business operation or process. A business operation or process in this sense is a collaboration of tasks, users or roles, and artifacts, in a way designed to achieve a particular functional aspect of business. A task is thus a logical activity designed to be performed automatically or by a user, in relation to a modular decomposition of a business process or operation.

As a further example, a non-functional concern may be to ensure integrity and non-repudiation of communication between two tasks within a business operation or process. That is, integrity in this sense is the assurance that a communication sent by the sender is received by the receiver in the same form and with the same content and meaning as it had when it left the sender. Non-repudiation in this sense means an assurance that a communication sent by the sender cannot later by denied to have been sent. A third example of a non-functional concern is to validate security policy authorization before allowing someone to perform a task within a business operation or process. A fourth example of a non-functional concern is to protect portions of data from unauthorized access. It should be apparent to a person skilled in the art there could be various other examples constructed which fall within the scope of this invention.

It is noted that non-functional concerns are in comparison to functional concerns. The functional concerns of a real-world system describe the core functional rules of the system. For example, within a banking system, the description of its core processes, such as a customer account management process, a credit transaction process, a debit transaction process, and so on, are the core functional concerns of the banking system.

The method first includes constructing one or more annotations profiles (102). Each annotations profile describes one or more annotations, where each annotation corresponds to and represents a non-functional concern to be addressed within the abstract model of the real-world system. An annotation is thus a structure description, qualifying and/or quantifying the non-functional expectations of a given non-functional concern from a particular model element of the abstract model, beyond the usual functionality accorded to the model element. A modeling element is a generic term used herein for the constituent parts of the abstract model representing the real-world system. A task or a connector between two tasks is an example of such a model element.

The annotations profiles categorize annotations representing non-functional concerns, into high-level abstracts, such as security, audit, persistence, scalability, and so on. Annotation profiles are thus constructed for these high-level abstracts. In one embodiment, an annotation profile is constructed by defining standard annotations (104), associated properties (106), and attributes (108) for addressing logically related non-functional concerns. The set of annotations within an annotations profile capture the non-functional expectations that may need to be specified for a given category while modeling a real-world system, to qualify these non-functional expectations in relation to the modeling elements of the abstract model.

For example, a security annotations profile may include annotations like authentication, policy, integrity, non-repudiation, confidentiality, and so on. Each of these annotations may then have a further set of attributes and/or properties that capture all the information details associated with the annotation in question. For example, an authorization-policy annotation may have associated attributes such as policy name, authorized users or roles, and so on. Thus, each annotations profile is a generalized schema that captures annotations. Capturing non-functional concerns for a new category of high-level abstracts is therefore achieved by creating a corresponding (new) annotations profile.

Next, each modeling element of the abstract model of the real-world system is associated with one or more annotations selected from the annotations profiles (110). The modeling elements of the abstract model, in other words, are annotated with desired annotations from all of the available standard annotations within the annotations profiles. The construction of the abstract model itself, by virtue of selecting, instantiating, and connecting appropriate modeling elements can be performed as is achieved conventionally, as can be appreciated by those of ordinary skill within the prior art. When a desired standard annotation of an annotations profile is selected for association with a given modeling element of the abstract model, a corresponding annotation may be instantiated and associated with this modeling element, such that the annotation persists.

In one embodiment, the modeling elements of the abstract model of the real-world system may themselves be categorized within one or more modeling element groups that are defined for the purposes of the non-functional concerns (112). At higher modeling levels, it can be useful to have generic intent statement for the non-functional concerns that span across a set of modeling elements. For example, it can make sense to state that all invocations of a particular task in a given business operation abstract model has to be security audited, or that all constituent tasks of a particular business operation have to be performed in a transaction supportive manner. Therefore, appropriate modeling element groups can be defined, and the modeling elements categorized within these groups, for the purposes of the non-functional concerns.

Associating one or more annotations and a dynamic group of modeling elements avoids annotation clutter of the elements, and renders the resulting annotations more usable and less error phone. The latter is substantially ensured because a modeling element just has to be associated with a given defined group of modeling elements, such that it automatically receives, or inherits, the annotations that have been associated with this group. That is, a user does not have to associate all the annotations with each individual modeling element of the group, but rather just has to associate all the annotations once for the modeling element group as a whole.

Therefore, once the modeling element groups have been defined and the modeling elements of the abstract model of the real-world system have been categorized as desired within these groups, annotations can be associated with the modeling element groups (114). The annotations are selected from the annotations profile, and the process of associating annotations with modeling element groups is overall similar to the process of association annotations with individual modeling elements, as has been described in part 110 of the method 100. Once an annotation has been associated with a given modeling element group, the annotation is instantiated for each modeling element of that group.

If a modeling element is added to a modeling element group that already has annotations associated therewith, then these annotations are instantiated for this new modeling element. Likewise, if a modeling element is removed from a modeling element group, any annotations that have been instantiated for the modeling element as a result of its being categorized within the group may be removed. Similarly, if an annotation is unassociated from a given modeling element group, the corresponding annotations that have been instantiated for the modeling elements categorized into this group may be removed.

Next, one or more transformation templates are constructed (116). Each transformation template defines the transformation of the abstract model to a specific implementation platform, such that the abstract model can be executed on that specific implementation platform. For example, an abstract model may be described in a given high-level language. For the abstract model to actually be executed, or tested, it may have to be transformed into a lower-level language. The transformation templates herein particularly describe how the annotations representing the non-functional concerns are transformed (with the abstract model itself) to specific implementation platforms. The transformation of the abstract model itself to a specific implementation platform may, by comparison, be performed as is achieved conventionally, and as can be appreciated by those of ordinary skill within the art.

Thus, a transformation template is constructed for each specific implementation platform to which the abstract model is to be transformed. A specific implementation platform may be a particular piece or set of modeling software, for instance, that reads abstract model definitions and executes the abstract model based thereon. In a further embodiment, inputs regarding the abstract model are received from a host generational framework on a model element-by-model element basis to generate implementation component mappings (118), which are then merged within a transformation template to generate an implementation model corresponding to the annotated non-functional concerns. That is, the abstract model is transformed to a specific implementation model using these implementation mappings (120).

The host generational framework in this context means a set of software components that allow visual representation and manipulation of a real-world system from various perspectives. For example, for a business process, such perspectives may include strategy, operation, solution, and execution perspectives. A transformation template, or transformation profile, is thus a set a transformation rules that converts annotations for non-functional concerns from a higher level (i.e., that of the abstract model) to a lower level (i.e., that of an implementation model for the abstract model and that can be implemented or executed on a specific implementation framework). These rules are the implementation component mappings which have been previously described. As each model element of the abstract model are output by the host generational framework for construction of an implementation model, so too are the annotations for the non-functional concerns of these model elements transformed for generation of the implementation model.

In other words, the transformation templates that are constructed permit transformation of the annotations for the non-functional concerns pertaining to the modeling elements to an implementation model that can be executed on, or consumed by, specific implementation platforms in conjunction with the transformation of the modeling elements themselves of the abstract model to the implementation model. The former thus represents an enhancement of existing modeling techniques. While existing modeling techniques permit modeling elements of an abstract model to be transformed to a specific implementation platform, and embodiments of the invention likewise permit the annotations for the non-functional concerns pertaining to these modeling elements to be transformed to the specific implementation platform.

Thereafter, the abstract model is executed, as has been transformed to specific implementation platforms to which the transformation templates corresponds (122), such that the annotations are consumed during execution of the abstract model. Consumption in this context refers to the reading of the annotations and performing any expected actions by components of the specific implementation platforms in accordance with the execution of the associated modeling elements. Thus, when a modeling element is invoked, any corresponding annotations are likewise performed, or consumed.

In a further embodiment, the deployment platform (i.e., a specific implementation platform) may itself be expected to consume the annotations. For example, where the deployment platform is the Java 2 Platform Enterprise Edition (J2EE), then the annotations may be translated to the JSR 250 common annotations specification, as can be appreciated by those of ordinary skill within the art. As such, the application server on which the J2EE is implemented may be expected to consume the annotations associated with the modeling elements.

In a further embodiment, by comparison, a consumer binding profile may be added as an implementation layer extension to the annotations profiles from which the annotations have been instantiated for the modeling elements. Such a binding profile can specify how a given annotation is to be consumed when a corresponding modeling element has been executed. That is, when the specific implementation platform executes a given modeling element, it then looks to the binding profiles to determine how to consume the annotations that have been associated within the corresponding modeling element. Thus, the binding profile is an extension profile that provides the required schema to capture the association between the modeling elements and the annotations during execution, for consumption of the annotations.

The embodiment of the invention described in relation to FIG. 1 provides for a modeling framework for capturing non-functional concerns, as annotations, in associate with an abstract model of a real-world system, such as a business process. It is platform independent insofar as the modeling framework is not transformed to an implementation model corresponding to a specific implementation platform until the abstract model itself has been thus transformed. As such, the embodiment of the invention described in relation to FIG. 1 provides for the conversion of captured non-functional concerns at higher modeling levels to corresponding platform-specific implementations.

Figure 2C:
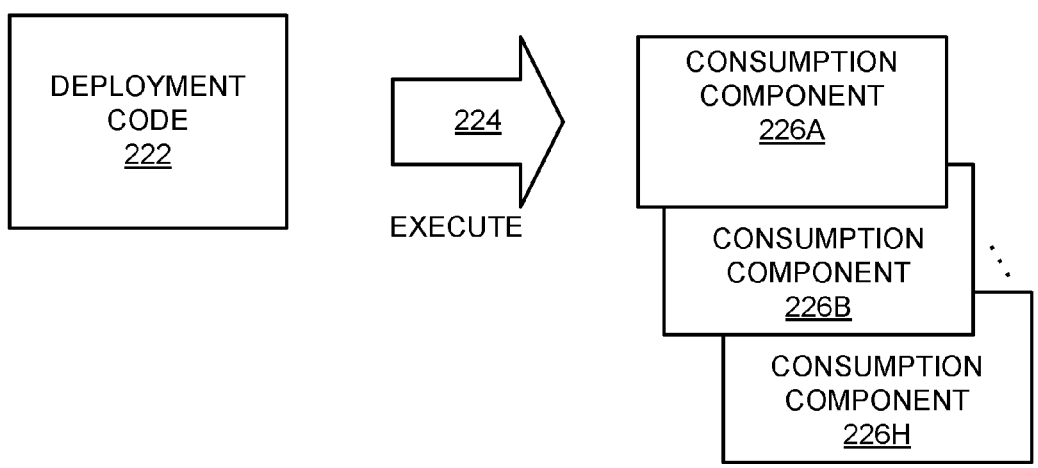

FIGS. 2A, 2B, and 2C illustratively depicted performance of the method 100 of FIG. 1, according to an embodiment of the invention. In FIG. 2A, annotations profiles 202A, 202B, . . . , 202N, collectively referred to as the annotations profiles 202, are defined within part 102 of the method 100. Each of the annotations profiles 202 includes a number of standard annotations. For example, the annotations profile 202A includes annotations 204A, 2043, . . . , 204M, collectively referred to as the annotations 204.

As indicated by 206, the annotations within the annotations profiles 202 are used to annotate modeling elements 208A, 208B, . . . , 208L, collectively referred to as the modeling elements 208. For instance, the modeling elements 208 have had associated therewith the annotations 210A, 210B, . . . , 210K, collectively referred to as the annotations 210, which are selected from the annotations profiles 202, in part 10 of the method 100 of FIG. 1. Each of the modeling elements 208 may have associated therewith one or more annotations, and not just one annotation as in FIG. 2A.

Furthermore, modeling elements may be categorized into modeling element groups, in part 112 of the method 100 of FIG. 1, and annotations associated with such modeling element groups, in part 114 of the method 100. For instance, one such modeling element group 211, including the modeling elements 212A, 212B, . . . , 212J, is depicted in FIG. 2A. The modeling element group 211 has an annotation 214 associated therewith, selected from the annotations profiles 202. Each modeling element group may have associated therewith one or more annotations, and not just one annotation as in FIG. 2A.

In FIG. 2B, an abstract model 215 has been constructed that includes a number of selected modeling elements 216A, 216B, . . . , 216I, collectively referred to as the modeling elements 216. The modeling elements 216 have annotations 218A, 218B, . . . , 218I, collectively referred to as the annotations 218, based on the annotations of the modeling elements in FIG. 2A. For example, the modeling element 216A may be an instantiation of the modeling element 208A of FIG. 2A, such that the annotation 218A is the annotation 210A. For example, the modeling element 216I may be an instantiation of the modeling element 212B of FIG. 2A, such that the annotation 218I is the annotation 214 that has been associated with the modeling element group 211 of which the modeling element 212B is a member.

The abstract model 215 is implemented, or transformed, to a lower-level model, as represented by the arrow 220. As such, part 116 of the method 100 of FIG. 1 A is performed, in which a transformation template is constructed that maps the annotations 218 associated with the modeling elements 216 of the abstract model 215 to corresponding modeling elements of the lower-level model. Ultimately, after transformation of the abstract model 216 using these implementation mappings, a deployment code 222 is generated. Execution of the deployment code on a specific implementation platform to which the transformation template in question corresponds results in consumption of the annotations 218 as has been mapped to corresponding modeling elements on this platform.

Thus, in FIG. 2C, the deployment code 222 is executed, as represented by 224, in part 122 of the method 100 of FIG. 1. A number of consumption components 226A, 226B, . . . , 226H, collectively referred to as the consumption components 226, may be defined and referenced by binding profiles associated with the annotations profiles 202. When a particular modeling element is executed, any annotations with which the modeling element has been associated are consumed by one or more of the consumption components 226. In this way, the annotations are consumed during ultimate execution of the abstract model 215 as has been transformed into the deployment code 222.

Figure 3:
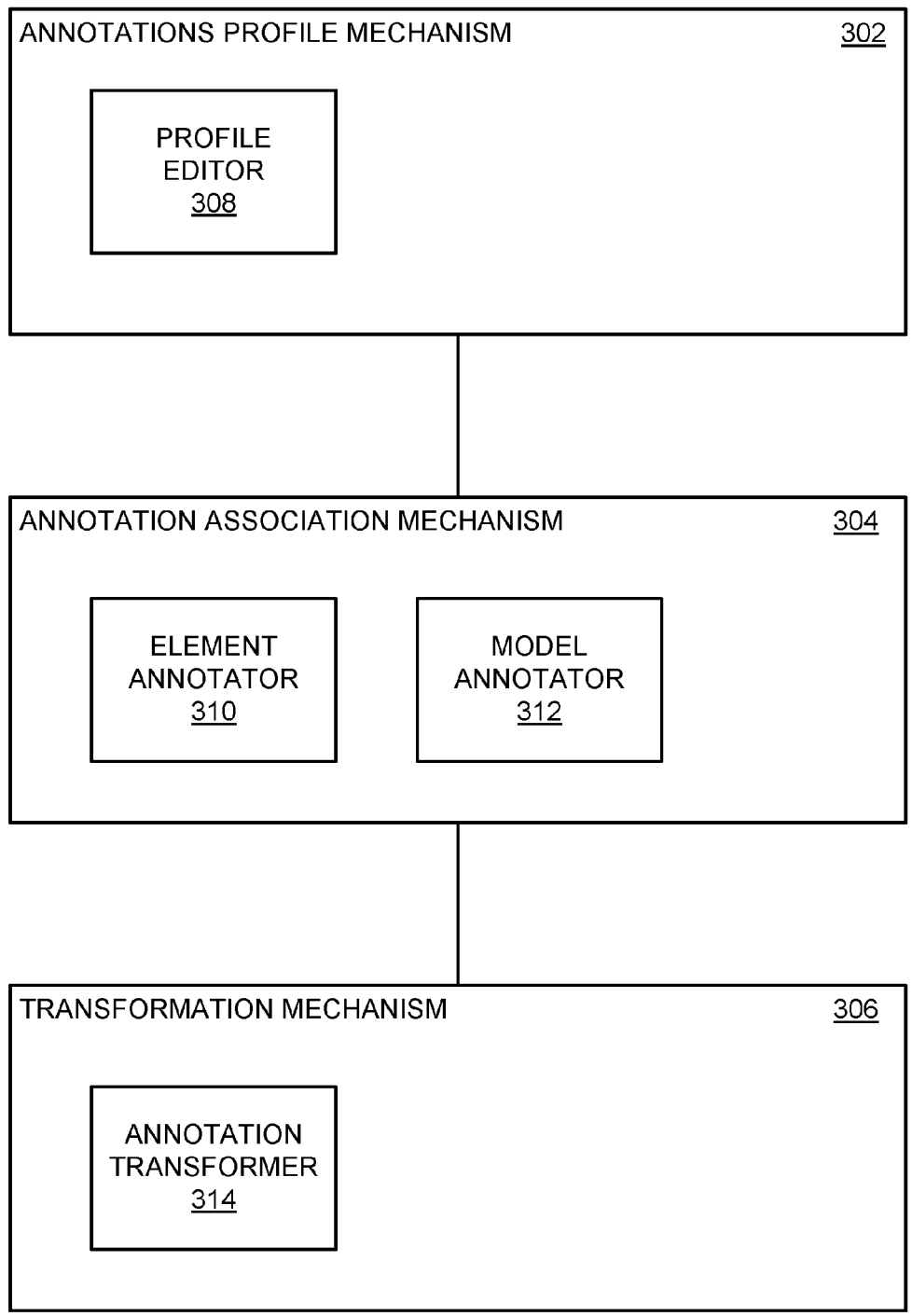
FIG. 3 is a diagram of a system, according to an embodiment of the invention.

FIG. 3 shows a computerized system 300, according to an embodiment of the invention. The system 300 includes an annotations profile mechanism 302, an annotation association mechanism 304, and a transformation mechanism 306. Each of the mechanisms 302, 304, and 306, as well as its sub-components or sub-mechanisms, may be implemented in software, hardware, or a combination of software and hardware. As those of ordinary skill within the art can appreciate, the system 300 may include other components and/or mechanisms, in addition to and/or in lieu of those depicted in FIG. 3.

The annotations profile mechanism 302 is for defining the annotations profiles that has been described previously. In a further embodiment, each annotation profile defines a schema that defines the annotations and their attributes and properties. Such a schema may be formatted in a markup language, such as the eXtensible Markup Language (XML). The annotations profile mechanism 302 includes a profile editor, by which the annotation profiles are created, viewed, and modified by a user using a user interface.

The annotation association mechanism 304 is for associating each modeling element with an annotation corresponding to a non-functional concern pertaining to the modeling element, as well as associating annotations with groups of modeling elements, as has been described previously. Such association may be achieved based on and/or using an element annotation profile that defines a schema defining associations between the modeling elements and/or the modeling element groups and the annotations. The annotation association mechanism 304 includes an element annotator 310, by which associations between the modeling elements and the annotations are created, viewed, and modified by a user using a user interface. The mechanism 304 also includes a model annotator 312, by which associations between the modeling element groups and the annotations are created, viewed, and modified by the user using a user interface.

The transformation mechanism 306 is for transforming an abstract model to a specific implementation platform, insofar as execution of the abstract model as transformed results in the non-functional concerns represented by the annotations associated with the modeling elements of the abstract model being consumed. The transformation mechanism 306 transforms the annotations of the abstract model to a specific implementation platform, based on a constructed transformation template, which includes a generation pattern for the specific implementation platform providing the implementation component mappings that have been described previously. The mechanism 306 includes an annotation transformer that specifically merges runtime context data of the transformed abstract model into the transformation template based on the generation pattern. The runtime context data is particular to the execution of the abstract model (as transformed) on the specific implementation platform in question.

Thus, the annotations profile mechanism 302 and the annotation association mechanism 304 can be considered as performing parts 102, 110, 112, and 114 of the method 100 of FIG. 1 as has been described previously, as illustratively depicted in FIG. 2A. By comparison, the transformation mechanism 306 can be considered as performing part 116 of the method 100 as described previously, as illustratively depicted in FIG. 2B. Part 122 of the method 100 is then performed to execute the abstract model as has been transformed to a specific implementation platform, such that the annotations are consumed as their corresponding modeling elements are executed, as illustratively depicted in FIG. 2C.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method for addressing non-functional concerns within an abstract model corresponding to a real-world system, comprising:
   constructing one or more annotations profiles, each annotations profile describing one or more annotations, each annotation corresponding to and representing one of the non-functional concerns;
   associating each of a plurality of modeling elements of the abstract model with an annotation corresponding to a non-functional concern of the modeling element;
   constructing one or more transformation templates, each transformation template transforming the abstract model, including the modeling elements thereof, to a specific implementation platform to which the transformation template corresponds; and,
   for each transformation template, executing the abstract model as has been transformed to the specific implementation platform to which the transformation template corresponds, such that the non-functional concerns represented by the annotations associated with the modeling elements of the abstract model are consumed.

2. The method of claim 1, wherein each non-functional concern corresponds to a requirement of the real-world system other than a core functional expectation of the real-world system.

3. The method of claim 1, wherein each non-functional concern is selected from the group of non-functional concerns essentially consisting of:
   an audit-related task;
   an integrity and non-communication repudiation-related task;
   a security policy validation-related task; and,
   a security authorization-related task.

4. The method of claim 1, wherein constructing the one or more annotations profiles comprises, for each annotations profile, one or more of:
   defining one or more standard annotations for the annotations profile;
   defining one or more associated properties for the annotations profile, the one or more associated properties addressing logically related non-functional concerns represented by the one or more standard annotations for the annotations profile; and,
   defining one or more attributes for each standard annotation capturing information details regarding the standard annotation.

5. The method of claim 1, wherein constructing the one or more transformation templates comprises, for each transformation template:
   for each of the plurality of modeling elements, generating an implementation mapping of the annotation with which the modeling element has been associated;
   transforming the abstract model to the specific implementation platform based on the transformation template, using the implementation mappings of the annotations to the modeling elements of the abstract model, such that an implementation model of the abstract model is generated for the specific implementation executable on the specific implementation platform and includes the annotations associated with the modeling elements.

6. The method of claim 5, wherein executing the abstract model for each transformation template comprises executing the implementation of the abstract model generated for the specific implementation corresponding to the transformation template.

7. The method of claim 1, wherein executing the abstract model for each transformation template comprises providing an implementation layer extension to each annotations profile, the implementation layer specifying information regarding consumption of the one or more annotations described by the annotations profile during execution of the abstract model.

8. The method of claim 1, further comprising:
   defining a plurality of modeling element groups; and,
   associating each modeling element group with one or more annotations of the annotations profiles.

9. The method of claim 8, wherein defining the plurality of modeling element groups comprises, for each modeling element group:
   grouping one or more of the plurality of modeling elements within the modeling element group.

10. A system comprising:
    an annotations profile mechanism to define one or more annotations profiles, each annotations profile defining one or more annotations, each annotation corresponding to and representing a functional concern of an abstract model;
    an annotation association mechanism to associate each of a plurality of modeling elements of the abstract model with an annotation corresponding to a non-functional concern pertaining to the modeling element; and,
    a transformation mechanism to transform the abstract model to a specific implementation platform, such that execution of the abstract model results in the non-functional concerns represented by the annotations associated with the modeling elements being consumed.

11. The system of claim 10, wherein each non-functional concern corresponds to a requirement of a real-world system to which the abstract model corresponds other than a core functional expectation of the real-world system.

12. The system of claim 10, wherein each annotations profile defines a schema defining the one or more annotations and relevant attributes of the functional concerns of the one or more annotations.

13. The system of claim 10, wherein the annotations profile mechanism comprises a profile editor by which the one or more annotations profiles are capable of being created, viewed, and modified by a user.

14. The system of claim 10, wherein the annotation association mechanism is to associate each modeling element with an annotation based on an element annotations profile.

15. The system of claim 14, wherein the element annotations profile defines a schema defining associations between the modeling elements and the annotations.

16. The system of claim 10, wherein the annotation association mechanism comprises an element annotator by which associations between the modeling elements and the annotations are capable of being created, viewed, and modified by a user.

17. The system of claim 10, wherein the annotation association mechanism comprises a model annotator by which associations of the annotations with multiple modeling elements are capable of being created, viewed, and modified by a user.

18. The system of claim 10, wherein the transformation mechanism is configured to transform the abstract model to the specific implementation platform based on a transformation template.

19. The system of claim 18, wherein the transformation template comprises a generation pattern for the specific implementation platform.

20. The system of claim 19, wherein the transformation mechanism comprises an annotation transformer to merge runtime context data into the transformation template based on the generation pattern, the runtime context data particular to execution of the abstract model on the specific implementation platform.

21. A computer-readable medium storing one or more computer programs that upon execution perform a method comprising:
   constructing one or more annotations profiles, each annotations profile describing one or more annotations, each annotation corresponding to and representing one of a plurality of non-functional concerns;
   associating each of a plurality of modeling elements of an abstract model with an annotation corresponding to a non-functional concern pertaining to the modeling element;
   defining a plurality of modeling element groups;
   associating each modeling element group with one of the annotations profiles;
   constructing one or more transformation templates, each transformation template transforming the abstract model to a specific implementation platform to which the transformation template corresponds; and,
   for each transformation template, executing the abstract model as has been transformed to the specific implementation platform to which the transformation template corresponds, such that the non-functional concerns represented by the annotations associated with the modeling elements of the abstract model are consumed.

22. The computer-readable medium of claim 21, wherein each non-functional concern corresponds to a requirement of a real-world system to which the abstract model corresponds other than a core functional expectation of the real-world system.

* * * * *